(12) United States Patent
Davelman et al.

(10) Patent No.: US 11,126,490 B2
(45) Date of Patent: Sep. 21, 2021

(54) APPARATUS AND METHODS FOR FAULT DETECTION IN A SYSTEM CONSISTED OF DEVICES CONNECTED TO A COMPUTER NETWORK

(71) Applicant: Vixtera, Inc., Danville, CA (US)

(72) Inventors: Yuriy Davelman, West Bloomfield, MI (US); Greg Ioffe, Danville, CA (US); Andrii Prosov, Kharkov (UA)

(73) Assignee: VIXTERA, INC., Danville, CA (US)

( * ) Notice: Subject to any disclaimer, the term of this patent is extended or adjusted under 35 U.S.C. 154(b) by 29 days.

(21) Appl. No.: 16/159,465

(22) Filed: Oct. 12, 2018

(65) Prior Publication Data
US 2020/0117528 A1 Apr. 16, 2020

(51) Int. Cl.
*G06F 11/07* (2006.01)

(52) U.S. Cl.
CPC ........ *G06F 11/079* (2013.01); *G06F 11/0709* (2013.01); *G06F 11/0751* (2013.01)

(58) Field of Classification Search
CPC ..................... G06F 11/079; G05B 23/0205
See application file for complete search history.

(56) References Cited

U.S. PATENT DOCUMENTS

| | | | | |
|---|---|---|---|---|
| 7,222,048 B2* | 5/2007 | Petchenev | .......... | G05B 23/0232 702/182 |
| 8,538,897 B2* | 9/2013 | Han | .......... | G06F 11/079 706/12 |
| 9,021,305 B2* | 4/2015 | Padilla | .......... | G06F 11/079 714/26 |
| 10,139,122 B2* | 11/2018 | Blair | .......... | G08B 21/187 |
| 10,579,459 B2* | 3/2020 | Bacha | .......... | G06F 11/079 |
| 2011/0141912 A1* | 6/2011 | Soures | .......... | G06F 11/079 370/242 |
| 2017/0262360 A1* | 9/2017 | Kochura | .......... | G06F 11/3688 |
| 2018/0174062 A1* | 6/2018 | Simo | .......... | G06N 3/08 |

* cited by examiner

*Primary Examiner* — Joseph R Kudirka
(74) *Attorney, Agent, or Firm* — Womble Bond Dickinson (US) LLP

(57) ABSTRACT

A method and apparatus of a management device that determine a root cause of a device failure is described. In an exemplary embodiment, the management device receives an indication of the device failure for a first device, where the first device is part of a system of a plurality of devices. The management device further applies a set of one or more rules to measure a set of input signals of the first device. if the set of input signals are within a corresponding operating range, the management device marks the first device as failed. Alternatively, if one or more of the set of input signals are outside the corresponding operating range, the management device iteratively determines that a second device of the plurality devices that is coupled to the first devices has at least one output signal that is outside of the corresponding operating range and the input signals of the second device is within the corresponding operating range, and marks the second device as a root cause failure of the first device.

18 Claims, 11 Drawing Sheets

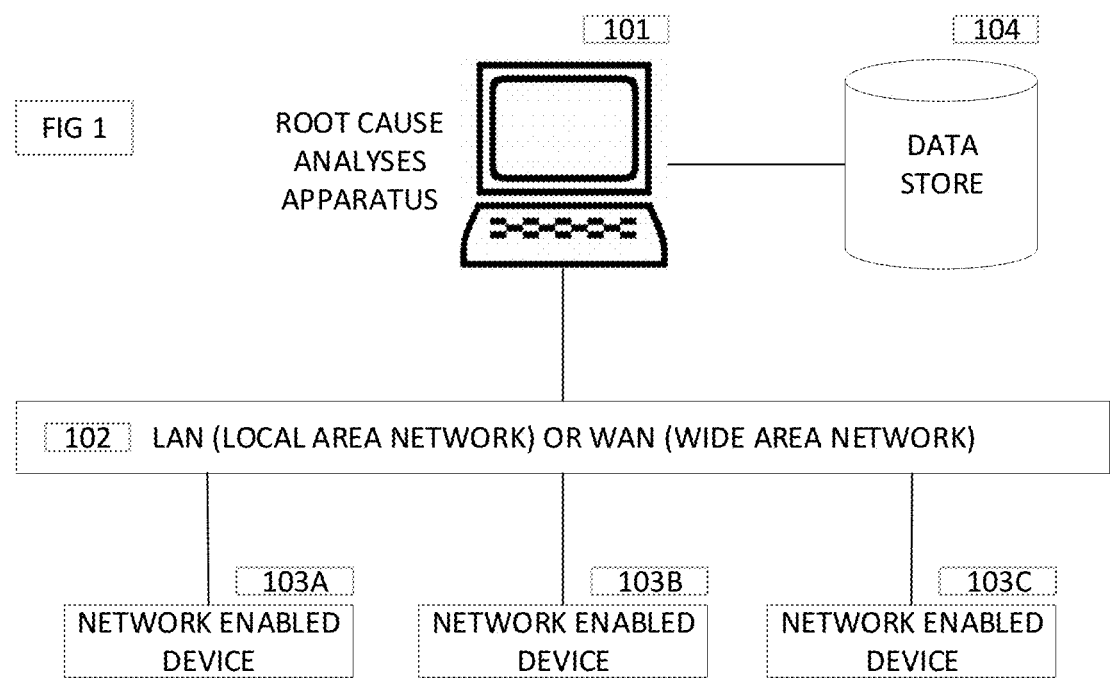

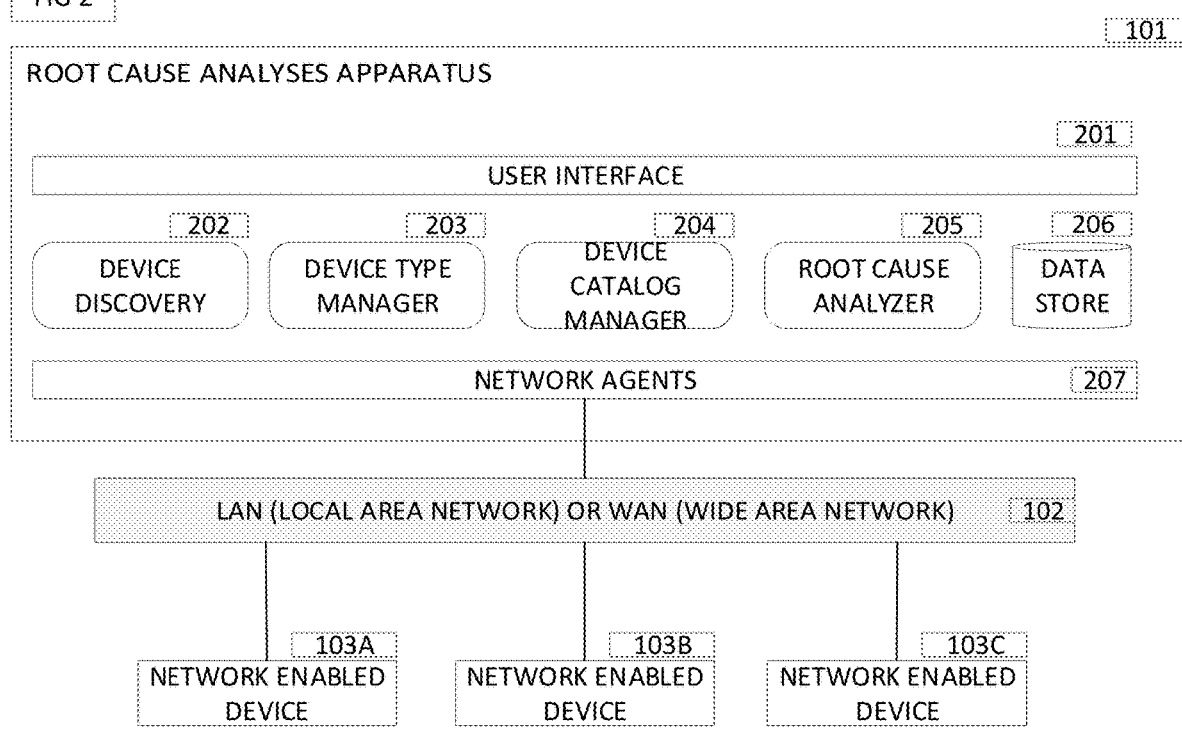

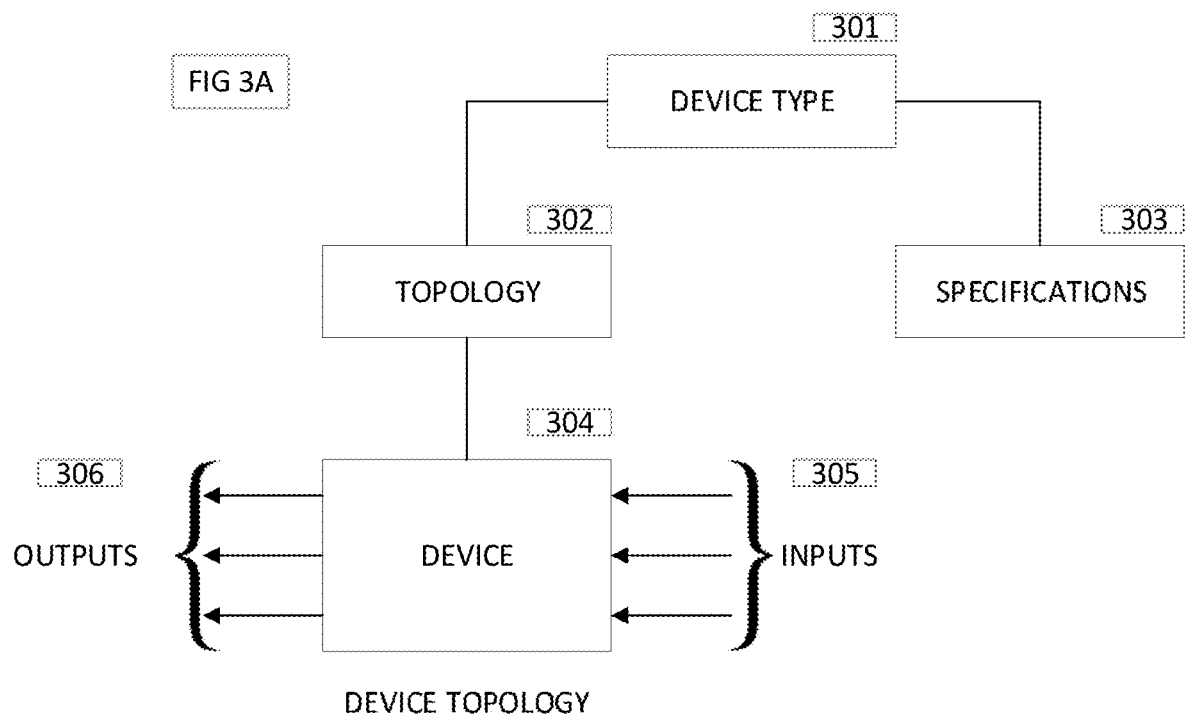

Rule: Output is incorrect because Input1 is below threshold
404

Rule example: Power is low because gas pressure is low
453

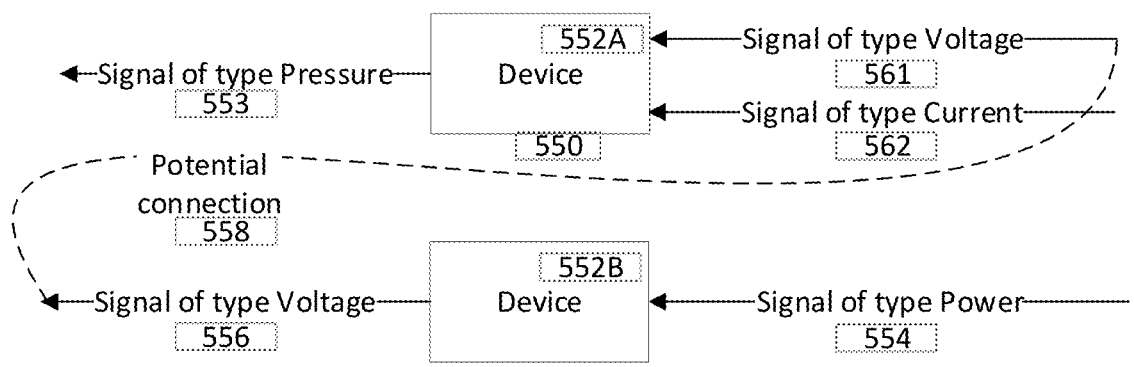

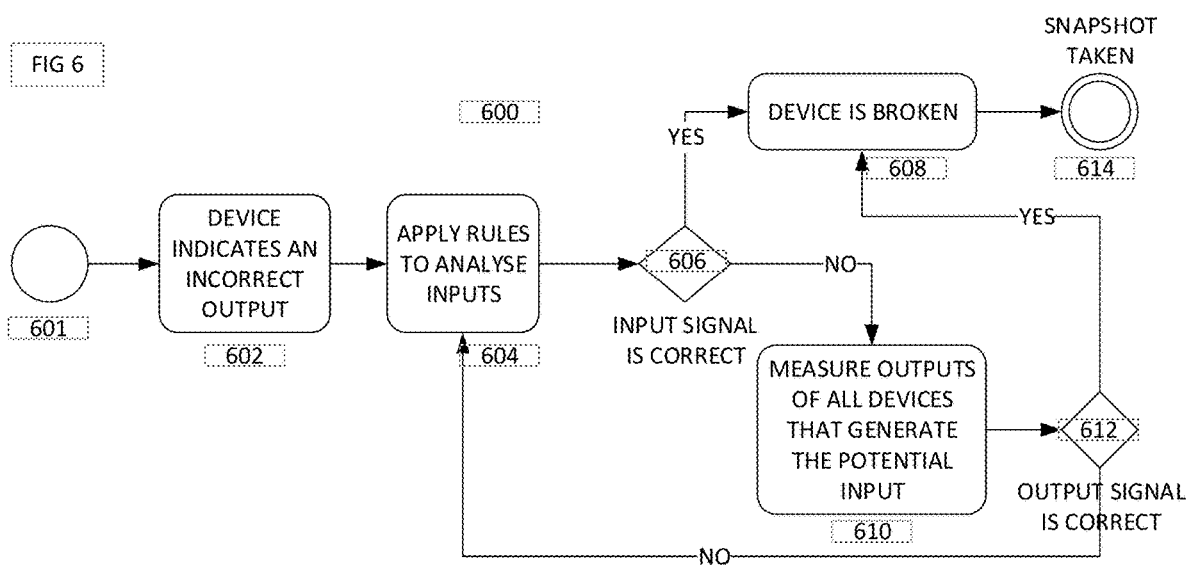

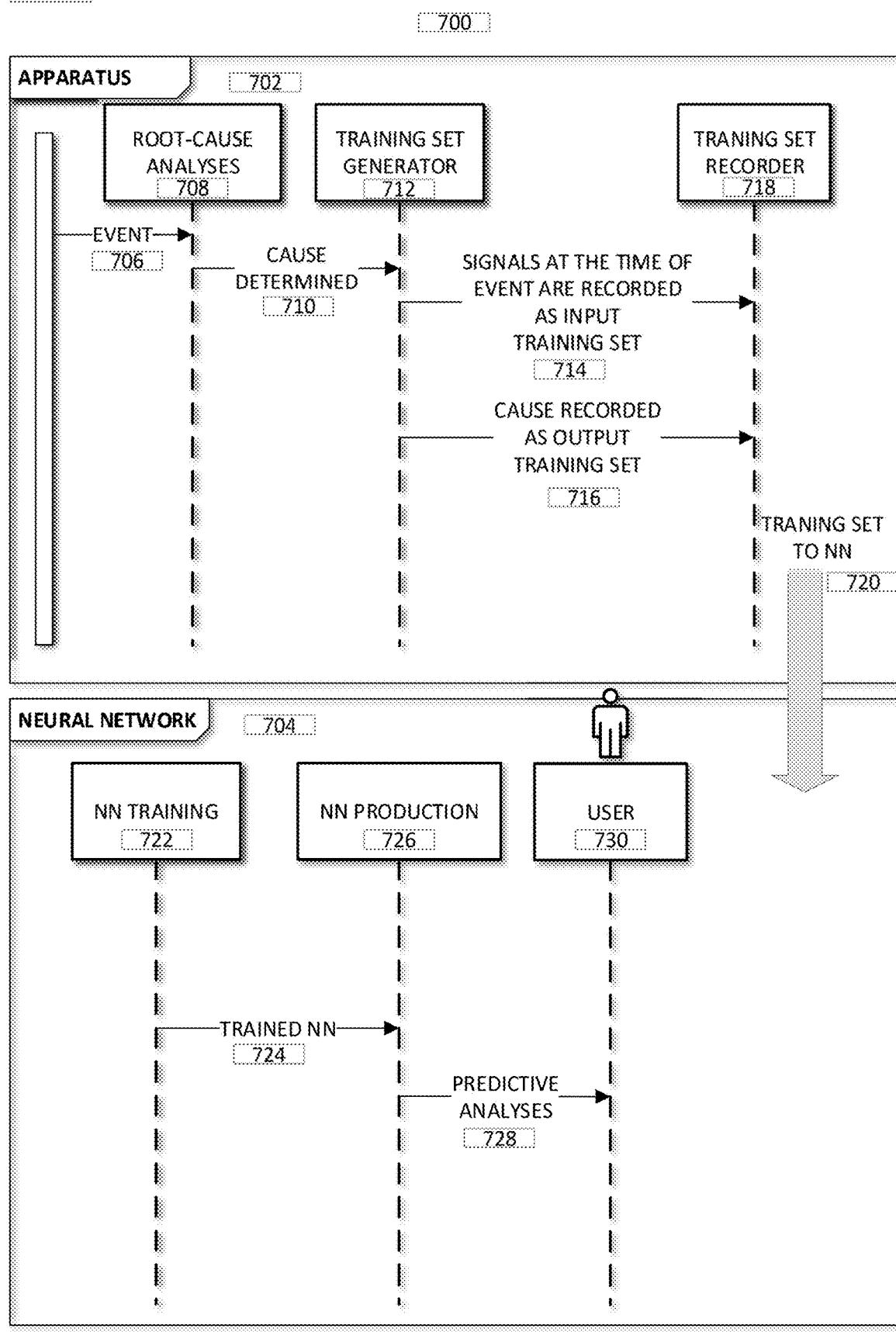

APPARATUS AND METHODS FOR FAULT DETECTION IN A SYSTEM CONSISTED OF DEVICES CONNECTED TO A COMPUTER NETWORK

FIELD OF INVENTION

This invention relates generally to device failure detection and specifically to fault detection based on a root cause analysis in a system that consists of devices connected to a computer network.

BACKGROUND OF THE INVENTION

Many of today's systems use fault detection to generate system events (alerts) and to drive diagnostic procedures. Fault detection is an important and critical monitoring process in the Industrial Internet of Things (IIoT). However, it is a difficult and complex task given numerous external and internal factors that might influence the cause of the faults

SUMMARY OF THE DESCRIPTION

A method and apparatus of a management device that determine a root cause of a device failure is described. In an exemplary embodiment, the management device receives an indication of the device failure for a first device, where the first device is part of a system of a plurality of devices. The management device further applies a set of one or more rules to measure a set of input signals of the first device. If the set of input signals are within a corresponding operating range, the management device marks the first device as failed. Alternatively, if one or more of the set of input signals are outside the corresponding operating range, the management device iteratively determines that a second device of the plurality devices that is coupled to the first devices has at least one output signal that is outside of the corresponding operating range and the input signals of the second device is within the corresponding operating range, and marks the second device as a root cause failure of the first device.

In a further embodiment, a method and apparatus of a device that generates a set of training data for a neural network is described. In one embodiment, the device receives a plurality of device failures of a system of a plurality of devices. In addition, for each of the plurality of device failures, the device determines a root cause for the device failure and generates a set of inputs and outputs for the plurality of devices at the time of device failure. Furthermore, the device adds the set of inputs and outputs and the root cause to the set of training data. The device additionally trains a neural network to predict a failure in the system with set of training data. The device further performs a predictive analysis on the system while the system is operating using the trained neural network.

Other methods and apparatuses are also described.

BRIEF DESCRIPTION OF THE DRAWINGS

The present invention is illustrated by way of example and not limitation in the Figures of the accompanying drawings in which like references indicate similar elements.

FIG. 1 is a block diagram of one embodiment of an apparatus and devices coupled over a network.

FIG. 2 is a block diagram of one embodiment of apparatus architecture to perform root cause analysis on a system of multiple devices.

FIG. 3A is a block diagram of one embodiment of a device topology and device type.

FIG. 5B is a block diagram of one embodiment of a device topology with multiple devices coupled together.

FIG. 6 is a flow diagram of one embodiment of a process to perform a root cause analyzer process.

FIG. 7 is a flow diagram of one embodiment of a process to perform automated training sets generation.

DETAILED DESCRIPTION

Figure 3B:
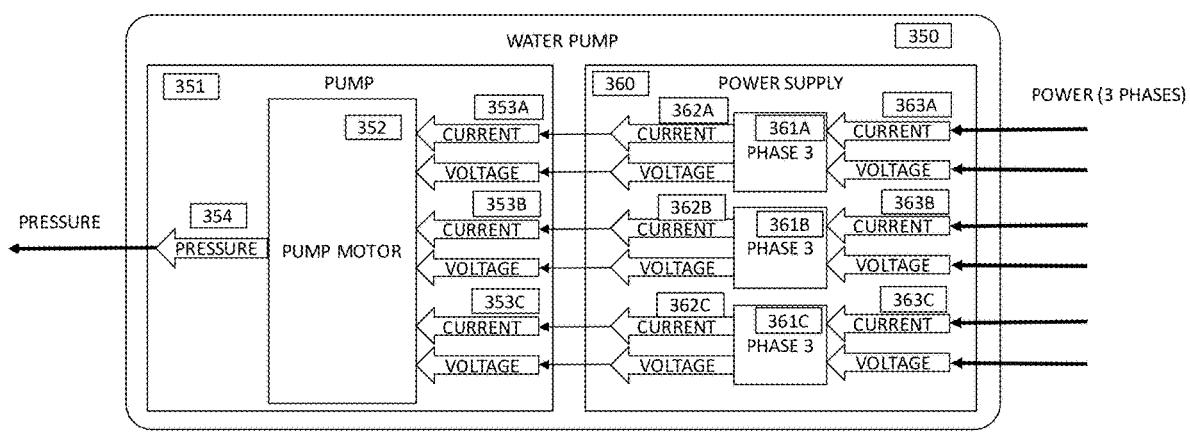
FIG. 3B is a block diagram of one embodiment of a single device topology with multiple components.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a network element that processes data by a network element with a data processing pipeline is described. In one embodiment, in the complex ecosystem of devices, a device that performs incorrectly may not necessarily the one that is malfunctioning. Often, other malfunctioned parts or devices of the ecosystem may cause this device to exhibit the erroneous behavior. For example, a below-threshold pressure of water pump could be the result of malfunctioning power supply which is a part of this complex ecosystem.

The method for root case analysis is based on the assumption that, if a device output(s) is incorrect while having the correct input(s), then this device is malfunctioning. However, if both input(s) and output(s) are incorrect, then some other devices in the ecosystem may cause this device to malfunction.

In one embodiment, the root cause analyzer performs the following actions:

- An incorrect device output is detected (say a water pump pressure has dropped)
- Device inputs will be analyzed based on device topology and rules
- In case the inputs are correct, the device itself is considered to be malfunctioning
- Similar methodology applies for the internal configuration of the device
- In case the inputs of the device in question are incorrect, the root cause analyzer looks for all potentially connected devices i.e., devices whose output(s) is of the same signal type as the inputs of the device with erroneous behavior.
- If incorrect output is detected, the process is repeated for a specific suspicious device in the ecosystem.
- The process continues until a device(s) with incorrect output(s) and correct input is detected. This device would be considered as malfunctioning at which point the process would be stopped.
- The result of this process is a list of all devices in the ecosystem that cause the original suspicious device to exhibit erroneous behavior (Failure Detection).

When device exhibits erroneous behavior (e.g., water pump's lower pressure), there is a need to understand a cause of the problem. The purpose of the root cause analysis apparatus is to identify the reason for the device's incorrect behavior.

FIG. 1 is a block diagram of one embodiment of an apparatus and devices coupled over a network. In FIG. 1, the root cause apparatus (101) is coupled to devices (103A-C) that generate live alerts and signal data either via local or wide area network (102). The root cause apparatus is further coupled to a data store (104) that stores information about alerts and data supplied by devices. In one embodiment, each of the devices 103A-C includes inputs to that device and outputs from the device that can be measured using a sensor for that input or output. In one embodiment, the device can be a water pump, air conditioner, power generator, power supply, and/or any other type of device. In a further embodiment, each of the inputs and/or output can have one or more thresholds that represent an acceptable operating range or environment. For example and in one embodiment, an input to a device can have a minimum threshold, a maximum threshold, and/or a combination thereof. Similarly, another device can have an output that has a minimum threshold, a maximum threshold, and/or a combination thereof. While in one embodiment, three devices are illustrated, in alternate embodiment, there can be more and less devices.

In one embodiment, the proper operating environment can be determined using a set of rules for each topology of the device 103A-C. In this embodiment, a device topology is characterized in a form of inputs and outputs, where inputs define the signals coming into device and outputs define the outgoing signals (for example in a water pump electric current and voltage are inputs and pressure is an output (as shown in FIG. 3B below)). Inputs and outputs have associated sensors to enable data collection. Each device may have an internal topology that can be also expressed in the terms of inputs and outputs. From the root cause analyzer point of view, any part of a device can be represented by topology and sensors that are associated with this part's inputs and outputs. In addition, each topology has a set of associated rules. A rule is a condition that defines the input values that may be the cause for the incorrect output value. For example, output pressure is less than 20 pa, because input voltage is less than 110V or electric current is less than 1.5 A.

FIG. 2 is a block diagram of one embodiment of apparatus architecture to perform root cause analysis on a system of multiple devices. In FIG. 2, the apparatus (101) architecture can be represented as a set of interconnected modules. In one embodiment, the apparatus includes the following modules:

- User interface (201)—allows for management of various entities and data visualization
- Device discovery (202)—automatically discovers devices, determines device type and stores device into device's catalog
- Device type manager (203)—a module that's responsible for managing (defining/changing/removing) device types (see FIG. 3A, 3B)
- Device catalog (204)—contains a complete list of all devices connected to the network
- Root cause analyzer (205)—identifies the reason(s) of incorrect device behavior
- Data store (206)—a database for data storage
- Network agents (207)—modules responsible for device/apparatus (103) network communications (102)

FIG. 3A is a block diagram of one embodiment of a device topology and device type. In FIG. 3A, device 304 is illustrated with a topology 302. In one embodiment, a device topology 304 is a representation of a single device as a black box with a set of inputs and set of outputs. Devices are potentially connected, but the invention does not require any particular connectivity schema. To enable the device analyses the method requires knowledge about device inputs and outputs. This is achieved by defining the device type and topology as follows: A device type (301) is a definition of a group of devices with a common set of characteristics (302) (specifications) and identical internal topology (303) (for example water pumps (FIG. 3B), air conditioners, power supplies.) For example and in one embodiment, a device type has similar topology. For example and in one embodiment, a water pump has a "pressure" output, but can have a single phase or multiple phases of power input. Generally speaking, a device type is a representation of identical output and identical set of rules. Each device type can have an internal topology. In one embodiment, internal topology is a representation of the internal structure of a single device as a set of black boxes. Each black box has a set of inputs and a set of outputs. Each black box represents a subcomponent. Black boxes are interconnected through inputs and outputs The device topology (304) is characterized in a form of inputs (305) and outputs (306), where inputs define the signals coming into device and outputs define the outgoing signals (for example, in a water pump electric current and voltage are inputs and pressure is an output as described in FIG. 3B below). Inputs and outputs have the associated sensors to enable data collection.

Each device may have an internal topology that can be also expressed in the terms of inputs and outputs. From the root cause analyzer point of view, any part of a device can be represented by a device's internal topology and sensors that are associated with this part's inputs and outputs FIG. 3B is a block diagram of one embodiment of a single device topology with multiple components. In FIG. 3B, a water pump 350 includes two components: pump 351 and power supply 360. In one embodiment, the pump 351 includes pump motor that has three input signals of current and voltage 353A-C and one output signal, pressure 354. The input signals 353A-C come from the output current and voltage signals 362A-C of the power supply 360. In addition, the power supply includes three phases 361A-C, where each of the phases 363A-C has input current and voltage signals 363A-C. In one embodiment, the root cause analyzer can analyze each of these signals (both input and output) to determine if there is a failure in one or more of the components 351 and 360 of the water pump 350.

Figure 4A:
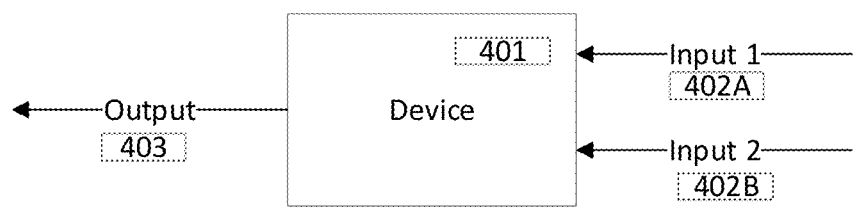
FIG. 4A is a block diagram of one embodiment of a device topology with a two input, one output associated rule.

FIG. 4A is a block diagram of one embodiment of a device topology with a two input, one output associated rule. In FIG. 4A, a device 401 has inputs 402A-B and output 403. In addition, the device 401 includes a rule 404 that can be used to evaluate whether the device is operating within acceptable parameter. In one embodiment, the input signals can be voltage, electrical current, pressure, and/or other types of input signals and the output signals can be voltage, electrical current, pressure, temperature, frequency and/or other types of signals. In addition, the rule 404 can be a rule that compares one or more of the inputs 402A-B with the output 403 to determine if the device 401 is operating normally (e.g., operating nominally or within nominal parameters). For example and in one embodiment, if one of the inputs 402A-B is outside of the thresholds (e.g., higher than a maximum threshold or lower than a minimum threshold), this device 401 is not receiving the correct signal for that input 402A-B. This can be a cause of the output 403 being out of specification (e.g., higher than a maximum threshold or lower than a minimum threshold). For example and in one embodiment, the input 402A is below an input threshold for this input 402A, which causes the output 403 to be incorrect.

In one embodiment, each topology (401) has a set of associated rules. A rule (404) is a condition that defines the input values (402) that may be the cause for the incorrect output value (403). For example, output pressure is less than 20 pa, because input voltage is less than 110V or electric current is less than 1.5 A.

One or more rules can be associated with a specific topology. Each rule(s) defines the inputs that should be analyzed when the outputs values are incorrect. While in one embodiment, a rule 404 can compare all of the inputs with the corresponding thresholds, in alternate embodiments, the rule can compare a subset of the inputs 402A-B with the corresponding thresholds. In addition, the rule can stipulate when an input 402A-B is used or not.

Figure 4B:
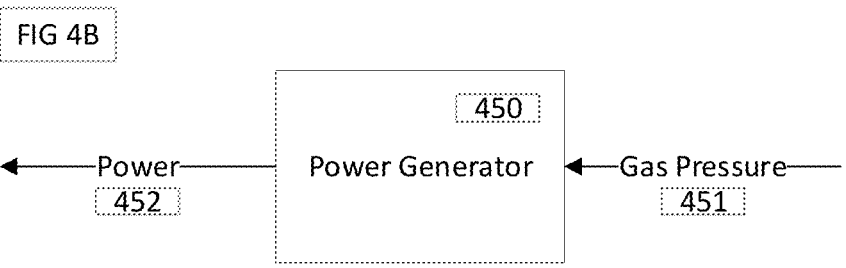
FIG. 4B is a block diagram of one embodiment of a device topology with a one input, one output associated rule.

FIG. 4B is a block diagram of one embodiment of a device topology with a one input, one output associated rule. In FIG. 4B, shows an example of a device (power generator) topology where the power generator has one input signal 451 that is natural gas, defined by gas pressure in psi, one output signal, electric power in kW and one rule defining the relationship between input and output.

Figure 5A:
FIG. 5A is a block diagram of one embodiment of a device topology with signal type inputs, one potential type output associated rule.

FIG. 5A is a block diagram of one embodiment of a device topology with signal type associated with each input and output. FIG. 5B shows a way how devices can be potentially connected. For example and in one embodiment, the output signal "Voltage" of one of the devices can potentially be connected to an input "Voltage" of another devices because both of these signals are of the same "Voltage" type. In one embodiment, topology (501) inputs and outputs are defined in terms of signal types (502). Signal types are an enumeration of known signals, such as pressure, power, electrical current, voltage, temperature, etc. Once the system determined that the reason for incorrect device behavior is not caused by the device itself, other devices in the ecosystem can be analyzed for incorrect behavior. In one embodiment, these devices outputs should be compatible with the analyzed device inputs.

There is usually no known schema of the connected devices, and the root cause analyzer checks all devices in the ecosystem that can potentially be connected to a device in question. The analyzer creates a logical schema and looks for devices with output signal type that is similar to the analyzed device input type assuming that devices with similar input type are potentially connected. For example, if a water pump input signal is voltage, the analyzer will be looking for all devices with voltage output as a signal type (503). In a complex ecosystem, inputs and outputs of the same signal type can be potentially connected.

FIG. 5B is a block diagram of one embodiment of a device topology with multiple devices coupled together. In FIG. 5B, In FIG. 5B, device 552A is coupled to device 552B, where device outputs a voltage 556 that is coupled to an input of the device 552A, namely the input voltage signal 561. In one embodiment, the input current signal is from another device (not illustrated). In one embodiment, device 553 has an output signal of type pressure (e.g., device 552A is a water pump or some other type of pump). If the pressure signal 553 is out of the normal operating range (e.g., too high or too low), the root cause analyzer apparatus would look to the input signals of the device 552A, namely inputs 561 (voltage signal) and 562 (current signal). If these input signals 561-2 are within the normal operating range, the root cause analyzer apparatus follows the potential connection 558 to measure the voltage signal 556 to determine if this signal is within the normal operating condition. In addition, the root cause analyzer determines if the power input power signal 554 is within normal operating range. If the output voltage signal 556 is outside the normal operating range, but the input power signal 554 is not, then the root cause analyzer apparatus would determine that cause of the device 552A failure is caused by device 552A.

In one embodiment, the root cause analyzer apparatus can find and integrate new devices added to the network (or conversely, identify removal of devices in the network). To find a new device, device discovery continually monitors the network using network agents. Once a new device is discovered, the root cause analyzer apparatus either gets assigned its type (configuration) from the catalog (in case of existing or known device) or sends a request to receive a new type and configuration associated with this new device. A newly discovered device will be placed into a catalog and is made available for the entire ecosystem and continued operation. The network agents continuously monitor the devices' signals and record them into the data store. If a device is removed from the network, the device is removed from the topology of the system along with the input and out signals.

Once a relevant (subject of a rule) alarm is detected from a specific device, the root cause analyzer identifies (FIG. 6) the reason for erroneous behavior, records results in the data store and notifies the users via the user interface. FIG. 6 is a flow diagram of one embodiment of a process 600 to perform a root cause analyzer process. In one embodiment, process 600 is performed by a root cause analyzer, such as the root cause analysis apparatus 101 as described in FIG. 2 above. In FIG. 6, process 600 begins by receiving an indication that a device has an incorrect output at block 602. In one embodiment, devices connected to the network generate alarms when a signal generated by the device is deemed incorrect. For example and in one embodiment, a water pump will generate an alarm if the output water pressure is below or above threshold. In one embodiment, network agents (207) on each of devices detect the alarms and trigger the root cause analyses process. In another embodiment, the root cause analyses can be triggered manually by the operator by pointing to a specific device.

At block 604, process 600 applies one or more rules for the inputs of the device. Rules are the means to determine which input(s) should be analyzed for a given output. For example, if the water pump pressure (output) is below threshold the rule will indicate that the power inputs for all 3 phases should be analyzed, but the pressure input can be ignored. Process 600 determines if the input signal(s) of the device were correct at block 606. In one embodiment, the signal is considered correct (or incorrect) if the rule formula returns a positive (or negative) value. For example, if the formula: 108V<="measured input voltage"<=120V process 600 returns true (e.g., "a "1"") if the input is correct, otherwise process 600 returns a false (e.g., "−1") if the input is incorrect or otherwise outside of the defined working range.

At block 608, if the input signal(s) are correct, process 600 determines that the device is broken. In one embodiment, if the device is receiving input signal(s) that are in the correct operating zone, then there is likely something wrong with how the device (or device component) is operating. Correct inputs mean that no external factors are affecting device performance. For example is the water pump pressure is low, but input power and input pressure are correct that means that a bearing in the pump itself is broken (or another type of internal failure), because no external reasons are causing the malfunction.

If the input signal(s) are correct for the device, at block 610, process 600 measures the output signal(s) of the devices that are potential input for this device (e.g., an output voltage of device is 110 volts. Each device connected to the network can be viewed as a set of sensors associated with inputs and outputs. Network agent (207) is aware of all the sensors associated with a given device, though, when the root cause analyzer requires a reading from a device input or output, it instructs the agent to perform the reading. The agent queries the result and returns the signal value associated with the input/output back to the analyzer.

At block 612, process 600 determines if the output signals feeding this device are correct. If the outputs are correct, execution proceeds to 608 above. If the outputs are not correct, execution proceeds to block 604 above. In one embodiment, while the root cause analyzer determines malfunctioning devices in their current state, the root cause analyzer apparatus can also create a possibility to predict future malfunctions by using data collected during the analyses process as training sets for neural networks (NN).

Predictive analysis (FIG. 7) is the ability to predict malfunctions based on the collected data throughout the device ecosystem. There are two major classifications in calculating predictive analysis:

Potential malfunctions within the current inventory
Potential malfunctions when a device(s) is added/removed/replaced to/from the inventory Machine learning (ML) is widely used technique for predictive analysis. In order for neural network (NN) to be used, it has to be trained. NN training is based on training data sets. Each training data set consists of two parts, the input data set and the "etalon" data set. The "etalon" data set is used for comparison between data sets generated by NN and desired data sets. The biggest challenge today in NN training is that "etalon" data sets have to be created (labeled) manually.

In one embodiment, the Root Cause Analyzer resolves this challenge by automatically generating the training data sets for NN. When a malfunction (failure) is detected in real-time, the root cause analyzer records all available signals as the input training sets and all analyzed devices' signals as the labeled outputs data set. These two data sets include: a) all inputs and outputs of devices that have been analyzed in the process of discovering the cause; and b) all signals in the time slot when the problem has been detected. The a) become a labeled training set and the b) becomes an input training set. Both sets are going to NN for training. A complete set of detected failures and trained data are analyzed over time and packaged for delivery of predictive maintenance and other applications that rely on predictive analysis.

As described above, the root cause analyzer apparatus can grab a snapshot of the input and output signals for each of the identified devices in FIG. 6. In one embodiment, this snapshot can be used to train as a part of a training set to predict future device failures. FIG. 7 is a flow diagram of one embodiment of a process 700 to perform automated training sets generation. In one embodiment, process 700 is performed by a root cause analyzer, such as the root cause analysis apparatus 101 as described in FIG. 2 above. In FIG. 7, process 700 begins by receiving an event at block 706. In one embodiment, the event can be an event that indicates that a device failure of that a device is operation outside of the specified operating conditions. Process 700 performs a root cause analysis that led to the event at block 708. In one embodiment, process 700 performs that root cause analysis as described in FIG. 6 above. In this embodiment, the root cause analysis can determine a cause (710).

At block 718, process 700 records a training set of data. In one embodiment, the training set can include a snapshot of signals that are recorded at the time of the event and a cause. This can include a) all inputs and outputs of devices that have been analyzed in the process of discovering the cause; and b) all signals in the time slot when the problem has been detected; and c) the cause of the device failure. For example and in one embodiment, a water pump low output pressure is caused by a malfunctioning power supply. The actual reason for power supply malfunctioning is high temperature in the power supply room. The root cause analyzer will determine the cause as power supply malfunction, but it would know nothing about temperature (power supply does not have "temperature" input). During the root case analyses process all readings from water pump and power supply inputs and outputs will be recorded. Recorded signals will include: output pressure, input power for the water pump and output/input current and voltage for the power supply. In the same time slot all signals available in the network will be recorded. These signals will, among others, include temperature. As a result, the neural network (NN) training set will contain all signals (including temperature) as input training set and signals collected from devices analyzed during root cause process as an output (etalon) training set. If there is a consistent relationship between high temperature and power supply malfunctioning, the trained NN would be able to predict the power supply malfunctioning if an actual input data set will contain high temperature readings. Thus, in the example, the NN training set can identify additional root causes that may or may not be apparent from the root cause analysis above. With the training set of data, process 700 sends the training set of data to a neural network training process at block 722. In addition, process 700 uses the training set of data to train a neural network. In one embodiment, process 700 uses the inputted training set of data to determine the different weights of the neural network. In one embodiment, this results in a trained neural network (724) that can be used to predict potential failures in the system. In one embodiment, if a device is added to the network, a new training set of data can be used to re-train the neural network by recording new sets of training as described above. Alternatively, the current neural network can be used with the addition of a new device in the network and the additional training data can be generated as per above. In a further embodiment, if a device is removed from the network, the input and output signals can be removed from the training set and the neural network can be re-trained for the smaller network.

At block 726, process 700 uses the neural network training set to perform predictive analysis (728). In one embodiment, the predictive analysis can be used to determine trouble spots and predict a failure. As described above, if the temperature is too high for a power supply feeding power to a water pump, the predictive analysis can predict that the water pump may fail as a result of the high temperature experienced by the power supply. This predictive analysis can then be used by a technician to correct the underlying problem. In another example, the predictive analysis can be used for predictive planning. In this example, an organization would like to add a new power supply to a room. In this example, a device to be added to the ecosystem has to be described as having a topology and a nominal defined in the specification as a set of values associated with its inputs and outputs. When nominal device input/output values are added to an actual NN input data set, it would emulate a device added to the ecosystem and, for example, if the input data set contains high temperature values it may predict power supply malfunction. Process 700 presents results of the predictive analysis at block 730.

Figure 8:
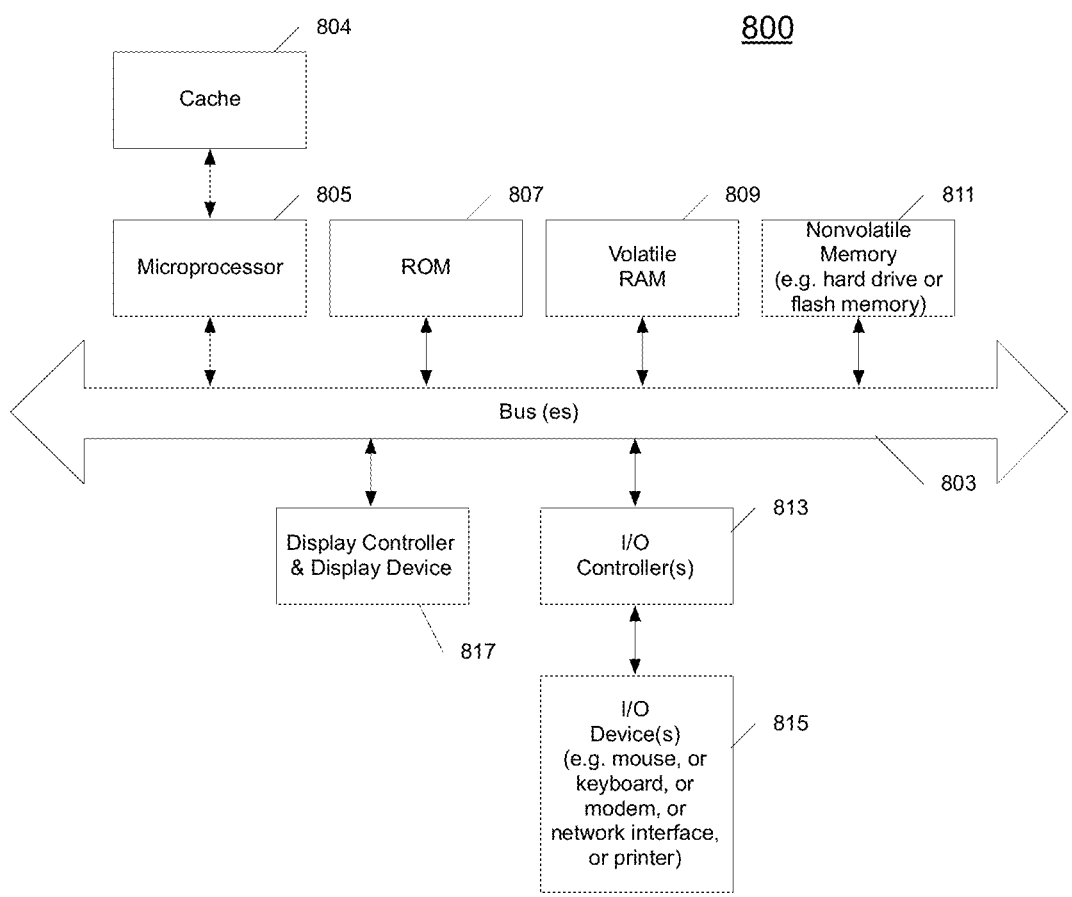
FIG. 8 illustrates one example of a typical computer system, which may be used in conjunction with the embodiments described herein.

FIG. 8 shows one example of a data processing system 800, which may be used with one embodiment of the present invention. For example, the system 800 may be implemented including an apparatus 101 as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 817 and to peripheral devices such as input/output (I/O) devices which may be mice, keyboards, modems, network interfaces, printers and other devices which are well known in the art. In one embodiment, the system 800 includes a plurality of network interfaces of the same or different type (e.g., Ethernet copper interface, Ethernet fiber interfaces, wireless, and/or other types of network interfaces). In this embodiment, the system 800 can include a forwarding engine to forward network date received on one interface out another interface.

Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 811 will also be a random-access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "performing," "generating," "determining," "marking," "applying," "adding," "training," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to determine a root cause of a device failure, the method comprising:
   receiving an indication of the device failure for a first device, wherein the first device is part of a system of a plurality of devices;
   measuring a set of input signals of the first device;
   applying a set of one or more rules to the set of input signals of the first device;
   if the set of input signals is within a corresponding operating range, marking the first device as failed; and
   if one or more of the set of input signals is outside the corresponding operating range,
      iteratively determining that a second device of the plurality of devices that is coupled to the first device has at least one output signal that is outside of the corresponding operating range and the input signals of the second device are within the corresponding operating range, and
      marking the second device as a root cause failure of the first device.

2. The non-transitory machine-readable medium of claim 1, wherein an operating range of a signal is defined by at least one of a maximum threshold of a signal value and a minimum threshold value of a signal value.

3. The non-transitory machine-readable medium of claim 1, wherein determining if a signal is within a corresponding operating range comprises:
   applying a rule to the signal that defines an operating range for that signal.

4. The non-transitory machine-readable medium of claim 3, wherein the rule is a condition that defines when an input signal value that is a cause for an incorrect output value.

5. The non-transitory machine-readable medium of claim 1, wherein the plurality of devices is arranged in an external topology that defines a connection between inputs and outputs of the plurality of devices.

6. The non-transitory machine-readable medium of claim 1, wherein the first device includes a plurality of coupled device components and at least an input of one of the plurality of coupled device components is connected to an output of another one of the plurality of coupled device components.

7. The non-transitory machine-readable medium of claim 1, wherein each of the devices in the plurality of devices includes a device type, and a device type is a definition of a group of devices with a common set of characteristics and an identical internal topology.

8. The non-transitory machine-readable medium of claim 1, wherein a device is selected from the group consisting of a water pump, air conditioners, power generator, and power supplies.

9. A non-transitory machine-readable medium having executable instructions to cause one or more processing units to perform a method to generate a set of training data for a neural network, the method comprising:
   receiving a plurality of device failures of a system of a plurality of devices;
   for each of the plurality of device failures,
      determining a root cause for a device failure, wherein the root cause for a failed device is a device that has input signals that are within an acceptable operating range and an output signal that is outside an acceptable operating range,
      generating a set of inputs and outputs for the plurality of devices at a time of device failure, and
      adding the set of inputs and outputs and the root cause to the set of training data;

training a neural network to predict a failure in the system with the set of training data; and performing predictive analysis on the system while the system is operating using the trained neural network.

10. A method to determine a root cause of a device failure, the method comprising:
receiving an indication of the device failure for a first device, wherein the first device is part of a system of a plurality of devices;
measuring a set of input signals of the first device;
applying a set of one or more rules to the set of input signals of the first device;
if the set of input signals is within a corresponding operating range, marking the first device as failed; and
if one or more of the set of input signals is outside the corresponding operating range,
iteratively determining that a second device of the plurality of devices that is coupled to the first device has at least one output signal that is outside of the corresponding operating range and the input signals of the second device are within the corresponding operating range, and
marking the second device as a root cause failure of the first device.

11. The method of claim 10, wherein an operating range of a signal is defined by at least one of a maximum threshold of a signal value and a minimum threshold value of a signal value.

12. The method of claim 10, wherein determining if a signal is within a corresponding operating range comprises:
applying a rule to the signal that defines an operating range for that signal.

13. The method of claim 12, wherein the rule is a condition that defines when an input signal value that is a cause for an incorrect output value.

14. The method of claim 10, wherein the plurality of devices is arranged in an external topology that defines a connection between inputs and outputs of the plurality of devices.

15. The method of claim 10, wherein the first device includes a plurality of coupled device components and at least an input of one of the plurality of coupled device components is connected to an output of another one of the plurality of coupled device components.

16. The method of claim 10, wherein each of the devices in the plurality of devices includes a device type, and a device type is a definition of a group of devices with a common set of characteristics and an identical internal topology.

17. The method of claim 10, wherein a device is selected from the group consisting of a water pump, air conditioners, power generator, and power supplies.

18. A method to generate a set of training data for a neural network, the method comprising:
receiving a plurality of device failures of a system of a plurality of devices;
for each of the plurality of device failures,
determining a root cause for a device failure, wherein the root cause for a failed device is a device that has input signals that are within an acceptable operating range and an output signal that is outside an acceptable operating range,
generating a set of inputs and outputs for the plurality of devices at a time of device failure, and
adding the set of inputs and outputs and the root cause to the set of training data;
training a neural network to predict a failure in the system with the set of training data; and
performing predictive analysis on the system while the system is operating using the trained neural network.

* * * * *